United States Patent
Lambert et al.

(10) Patent No.: US 7,215,780 B2
(45) Date of Patent: May 8, 2007

(54) METHOD AND APPARATUS FOR ELLIPTIC CURVE SCALAR MULTIPLICATION

(75) Inventors: Robert J. Lambert, Cambridge (CA); Ashok Vadekar, Rockwood (CA); Adrian Antipa, Mississauga (CA)

(73) Assignee: Certicom Corp., Mississauga (CA)

( * ) Notice: Subject to any disclaimer, the term of this patent is extended or adjusted under 35 U.S.C. 154(b) by 655 days.

(21) Appl. No.: 10/058,214

(22) Filed: Jan. 29, 2002

(65) Prior Publication Data

US 2003/0123655 A1    Jul. 3, 2003

Related U.S. Application Data

(60) Provisional application No. 60/343,225, filed on Dec. 31, 2001.

(51) Int. Cl.
*H04L 9/00*    (2006.01)

(52) U.S. Cl. .................. 380/279; 380/282; 380/285

(58) Field of Classification Search ............... 380/279, 380/282, 285
See application file for complete search history.

(56) References Cited

U.S. PATENT DOCUMENTS

| | | | | |
|---|---|---|---|---|
| 5,373,560 | A | * | 12/1994 | Schlafly ...................... 380/30 |
| 5,889,865 | A | * | 3/1999 | Vanstone et al. ............ 713/171 |
| 6,122,736 | A | * | 9/2000 | Vanstone et al. ............ 713/169 |
| 6,212,279 | B1 | | 4/2001 | Reiter et al. |
| 6,243,467 | B1 | | 6/2001 | Reiter et al. |
| 6,430,588 | B1 | * | 8/2002 | Kobayashi et al. ......... 708/492 |

OTHER PUBLICATIONS

Jerome A. Solinas, An Improved Algorithm for Arithmetic on a Family of Elliptic Curves, Advances in Cryptology—CRYPTO '97, 1997, 357-371.

Jerome A. Solinas, Improved Algorithms for Arithmetic on Anomalous Binary Curves, Technical Report, 1999. Available at http://cacr.uwaterloo.ca.

* cited by examiner

*Primary Examiner*—Ayaz Sheikh
*Assistant Examiner*—Kaveh Abrishamkar
(74) *Attorney, Agent, or Firm*—Blake, Cassels & Graydon LLP; John R.S. Orange; Brett J. Slaney

(57) ABSTRACT

The applicants have recognized an alternate method of performing modular reduction that admits precomputation. The precomputation is enabled by approximating the inverse of the truncator T, which does not depend on the scalar.

The applicants have also recognized that the representation of a scalar in a $\tau$-adic representation may be optimized for each scalar that is needed.

The applicants have further recognized that a standard rounding algorithm may be used to perform reduction modulo the truncator.

In general terms, there is provided a method of reducing a scalar modulo a truncator, by pre-computing an inverse of the truncator. Each scalar multiplication then utilizes the pre-computed inverse to enable computation of the scalar multiplication without requiring a division by the truncator for each scalar multiplication.

9 Claims, 5 Drawing Sheets

METHOD AND APPARATUS FOR ELLIPTIC CURVE SCALAR MULTIPLICATION

This application claims the benefit of U.S. Provisional Application No. 60/343,225, filed Dec. 31, 2001, the contents of which are incorporated herein by reference.

FIELD OF THE INVENTION

The present invention relates to cryptography, and more particularly to the computation of elliptic curve scalar multiplication.

BACKGROUND OF THE INVENTION

Cryptography is commonly used to provide data security over public networks, such as the Internet. Cryptographic protocols enable certain security goals to be achieved for various applications. A particularly efficient form of cryptography that is used in constrained devices is elliptic curve cryptography. Elliptic curve cryptography (ECC) is performed in a group of points on an elliptic curve. Such groups provide security at smaller bit sizes than alternative schemes.

The main operation in elliptic curve cryptography is so-called scalar multiplication, that computing an integer multiple of a point on an elliptic curve. Increases in efficiency may be obtained by increasing the speed at which elliptic curve scalar multiplication is performed. Certain elliptic curves allow faster computation because of special structure within the elliptic curve group. The special structure in the group means that there are special relationships between group elements. These relationships allow some computations to be performed more efficiently than in the general case.

One class of curves with special structure in the elliptic curve groups is those that provide a complex multiplication operation. Typically these curves are the Koblitz curves, also known as anomalous binary curves. These curves have a defining equation $y^2+xy=x^3+a_1x^2+1$, where $a_1$ is either 0 or 1. The points in the elliptic curve group defined by such an equation are the points (x,y) that satisfy the equation, where x and y are elements of the finite field $F_{2^m}$, along with a special point called the "point at infinity." The point at infinity operates as the zero element of the group. On a Koblitz curve, the Frobenius mapping $\tau$: $(x,y) \to (x^2, y^2)$ is efficiently computable and satisfies a characteristic equation $\tau^2+2=\mu\tau$, where $\mu$ is $-1$ if a is 0 and $\mu$ is 1 if a is 1. The mapping X may be regarded as a complex number, namely the solution to the characteristic equation. Points on the curve may be multiplied by certain complex numbers that are written in terms of $\tau$, whereas in the usual case points may only be multiplied by integers. Multiplying a point by $\tau$ corresponds to applying the Frobenius mapping to the point. In a technical report entitled *Improved Algorithms for Arithmetic on Anomalous Binary Curves* by Jerome Solinas, 1999, available at http://www.cacr.uwaterloo.ca, the properties of the Frobenius mapping and its use to accelerate computations are analyzed in detail.

By applying the relationship $\tau^2+2=\mu\tau$, the degree of a polynomial in $\tau$ can be reduced. Thus, any polynomial in $\tau$ can be represented in the form $A+B\tau$ after appropriate reduction.

The existence of complex multiplication on a curve means that scalars may be operated on modulo a truncator, T, which operates as an identity element under scalar multiplication. It can be shown that the value $$T = \frac{\tau^m - 1}{\tau - 1}$$

works as a truncator. The truncator may also be expressed in the form $A+B\tau$ by using the relationship $\tau^2+2=\mu\tau$ to obtain integers a and b such that $T=a+b\tau$. The conjugate of the truncator T is denoted by $\overline{T}$. The product $T\overline{T}$ is defined as the norm of T. is denoted N(T) and can be calculated as $N(T) = a^2+\mu ab+2b^2$, an integer.

In order to compute an elliptic curve multiplication of a scalar k by a point P, Solinas teaches how to perform a modular reduction of k. The truncator T is the modulus. This method requires finding a quotient q and a remainder r satisfying the equation $k=qT+r$ where the remainder r is as small in norm as possible. The remainder r is the result of a modular reduction of k modulo T. Solinas teaches a method of rounding off $$\frac{k}{T}$$

and then solving for the remainder r. In this method, a quantity $\lambda$ is computed as $$\lambda = \frac{k}{T}.$$

The quantity $\lambda$ is expressed in the form $A+B\tau$ by multiplying the numerator and denominator by the complex conjugate $\overline{T}$ of T. Thus $$\lambda = \frac{k}{T} = \frac{k\overline{T}}{N(T)}.$$

Then the quantity $\lambda$ is rounded using a special purpose rounding algorithm, referred to as Routine 60. The rounding method operates on $\lambda$ based on a geometric construction that is particular to arithmetic using $\tau$. The rounded value of $\lambda$ is used as the quotient q, so that the remainder r may be computed as $r=k-qT$. The remainder r is the value of k reduced modulo the truncator.

It is recognized that for a truncator T, the quantity kP is equivalent to (k−qY)P for all q since TP is equal to the point at infinity, which operates as the zero element in the elliptic curve group. Certain choices of the quotient q will lead to scalars for which multiplication is faster than others. Accordingly, it is of interest to efficiently find a quotient q so that multiplication by k−qT is more efficient than multiplication by k.

The algorithm that Solinas teaches for reducing a scalar modulo the truncator requires the special purpose rounding algorithm to be executed each time a scalar multiplication is required. It optimizes based on an average case analysis and therefore requires extensive computation for each scalar multiplication. This is particularly onerous in constrained devices with limited computing power such as PDA's (Personal Digital Assistants), wireless devices, and the like.

Solinas presents a more efficient method of performing the modular reduction. It obtains an element r' that is congruent to k modulo T. but not necessarily of minimal norm. This improvement focusses on the computation of λ. Solinas teaches computing an approximation of the coefficients of λ, then using these approximate coefficients in the special purpose rounding algorithm. However, this method still requires use of the special purpose rounding algorithm. Further, this method requires execution of the approximate division algorithm each time a scalar multiplication is performed since the quantity $$\lambda = \frac{k}{T}$$

depends on the scalar k.

Accordingly, there is a need for a method of performing elliptic curve scalar multiplications that obviates or mitigates at least some of the above disadvantages.

SUMMARY OF THE INVENTION

The applicants have recognized an alternate method of performing modular reduction that admits precomputation. The precomputation is enabled by approximating the inverse of the truncator T. which does not depend on the scalar.

The applicants have also recognized that the representation of a scalar in a τ-adic representation may be optimized for each scalar that is needed.

The applicants have further recognized that a standard rounding algorithm may be used to perform reduction modulo the truncator.

In general terms, there is provided a method of reducing a scalar modulo a truncator, by pre-computing an inverse of the truncator. Each scalar multiplication then utilizes the pre-computed inverse to enable computation of the scalar multiplication without requiring a division by the truncator for each scalar multiplication.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
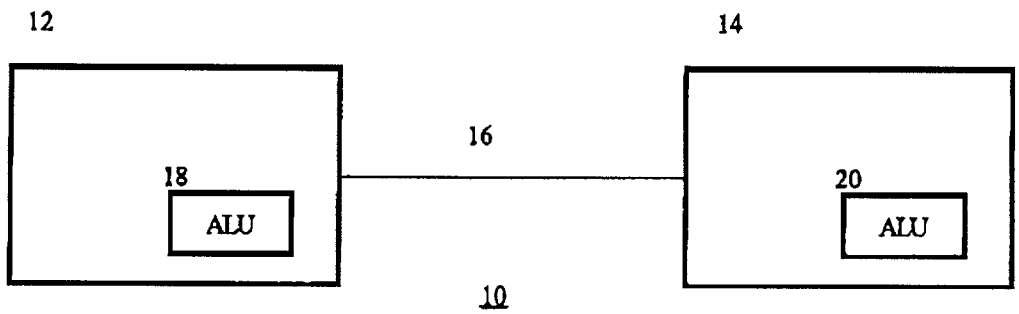
FIG. 1 is a schematic representation of a cryptographic system.

Referring to FIG. 1, a cryptographic system is shown generally by the numeral 10. A pair of correspondents 12, 14 communicate over a network 16. Each correspondent has an arithmetic logic unit (ALU) 18, 20, and elliptic curve parameters. The ALU can be a general-purpose computer, with a cryptographic unit, which implements cryptographic protocols from instructions provided by software. The software may be provided on a data carrier or in dedicated hardware. The cryptographic unit implements Elliptic Curve Cryptography. Each correspondent's elliptic curve parameters comprise an elliptic curve equation $y^2+xy=x^{3+a_1}x^2+1$, where $a_1$ is either 0 or 1, a finite field, a long-term private key, corresponding long-term public key, and a set of pre-computed parameters s, t, r. The correspondents make an authentic copy of long-term public keys available through a directory or a certificate.

To implement a protocol, for example ECDSA (Elliptic Curve Digital Signature Algorithm), one ALU 18, 20 selects a number k as its session or ephemeral private key. To compute the corresponding public key, it is necessary to compute kP. The ALU performs the steps shown in FIG. 2 in order to compute kP and uses the set of precomputed parameters to compute more efficiently.

Prior to the computation of kP, the parameters s, t, u are obtained. These may be computed at initialization or retrieved from values provided with the software to implement the selected protocols.

The precomputed parameters relate to an approximation of the truncator T. In the preferred embodiment, the truncator is $$T = \frac{\tau^m - 1}{\tau - 1}.$$

To approximate the inverse $$\frac{1}{T}$$

of the truncator T, a significance parameter u and two integers s and τ are chosen so that $$\frac{s}{2^u} + \frac{t}{2^u}\tau$$

approximates the inverse of the truncator T.

The values s and t depend on the truncator T. and may be computed by first expressing the truncator in the form T=a +bτ, where a and b are integers. The quantities a and b are determined by the truncator, and maybe computed by successive applications of the relationship $\tau^3+2=\mu\tau$ so that T is represented as the sum of an integer, a, and an integer, b, multiplied by τ.

Then a quantity $$\frac{1}{T} = \frac{1}{a+b\tau}$$

may be expressed as a polynomial by rationalizing the denominator. It is recognized that the element a+bμ−bτ is a conjugate of T=a +bτ. It can also be verified that (a+bτ)(a+bμ−bτ)=$a^2+\mu ab+2b^2$, the norm of T. Defining c=a +bμ and $e=-b$, the conjugate may be denoted as $c+e\tau$, where $c$ and $e$ are integers. Defining $d=a^2+\mu ab+2b^2$, then means that $$\frac{1}{T} = \frac{c+e\tau}{d},$$

where $c$, $d$, and $e$ are integers.

The expression for $$\frac{1}{T}$$

requires divisions, and so in general $$\frac{c}{d} \text{ and } \frac{e}{d}$$

will be real numbers that cannot be computed to arbitrary accuracy. In order to compute efficiently, significance parameter u is chosen to determine the accuracy with which $$\frac{1}{T}$$

will be represented.

Using the notation that $]x[$ means an integer close to a real number $x$, the value $s$ is taken to be $$s = \left] \frac{c}{d} 2^u \right[$$

and the value $t$ is taken to be $$t = \left] \frac{e}{d} 2^u \right[.$$

Once the parameters s and t are precomputed, an appropriate quotient q may be computed for any chosen k simply by computing the formula $$q = \left] \frac{ks}{2^u} \right[ + \left] \frac{kt}{2^u} \right[ \tau.$$

Once a value for the quotient q is obtained, a remainder r may be computed as $k-qT$ to obtain a value equivalent to k modulo T that admits to efficient computation. This is because q is approximately equal to $$\frac{k}{T}$$

and so qT is close to k and therefore k−qT is close to 0, with its exact magnitude determined by the choice of the significance parameter u.

Figure 2:
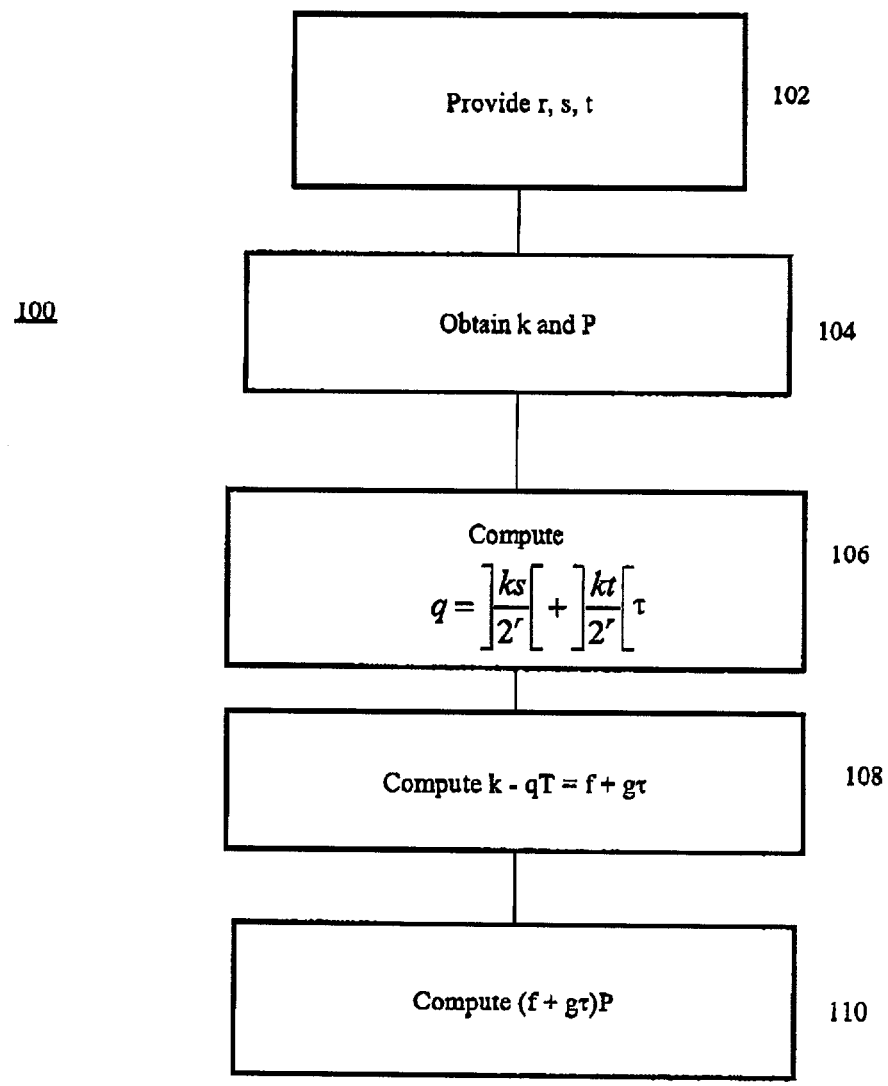
FIG. 2 is a flowchart showing a method performed by a correspondent of FIG. 1.

Referring therefore to FIG. 2, a method for computing a product kP is shown generally by the numeral 100. The correspondent 12 first obtains as indicated at 102, the pre-computed parameters. These are the significance parameter u, and the two coefficients s, t. Then, the correspondent 12 obtains (104) the scalar k and the point P for which it wants to compute kP. The correspondent 12 computes (106) a quotient q by using the formula $$q = \left] \frac{ks}{2^u} \right[ + \left] \frac{kt}{2^u} \right[ \tau.$$

The correspondent 12 computes (108) the value of k−qT in the form f+gτ to obtain a remainder r equivalent to k modulo the truncator T. Then, the correspondent 12 computes (110) the quantity (f+gτ)P by using a simultaneous exponentiation algorithm. Since the remainder r is equivalent to k modulo the truncator T, the quantity (f+gτ)P is equivalent to k modulo T. and accordingly scalar multiplication by k is equivalent to scalar multiplication by (f+gτ)P.

Figure 3:
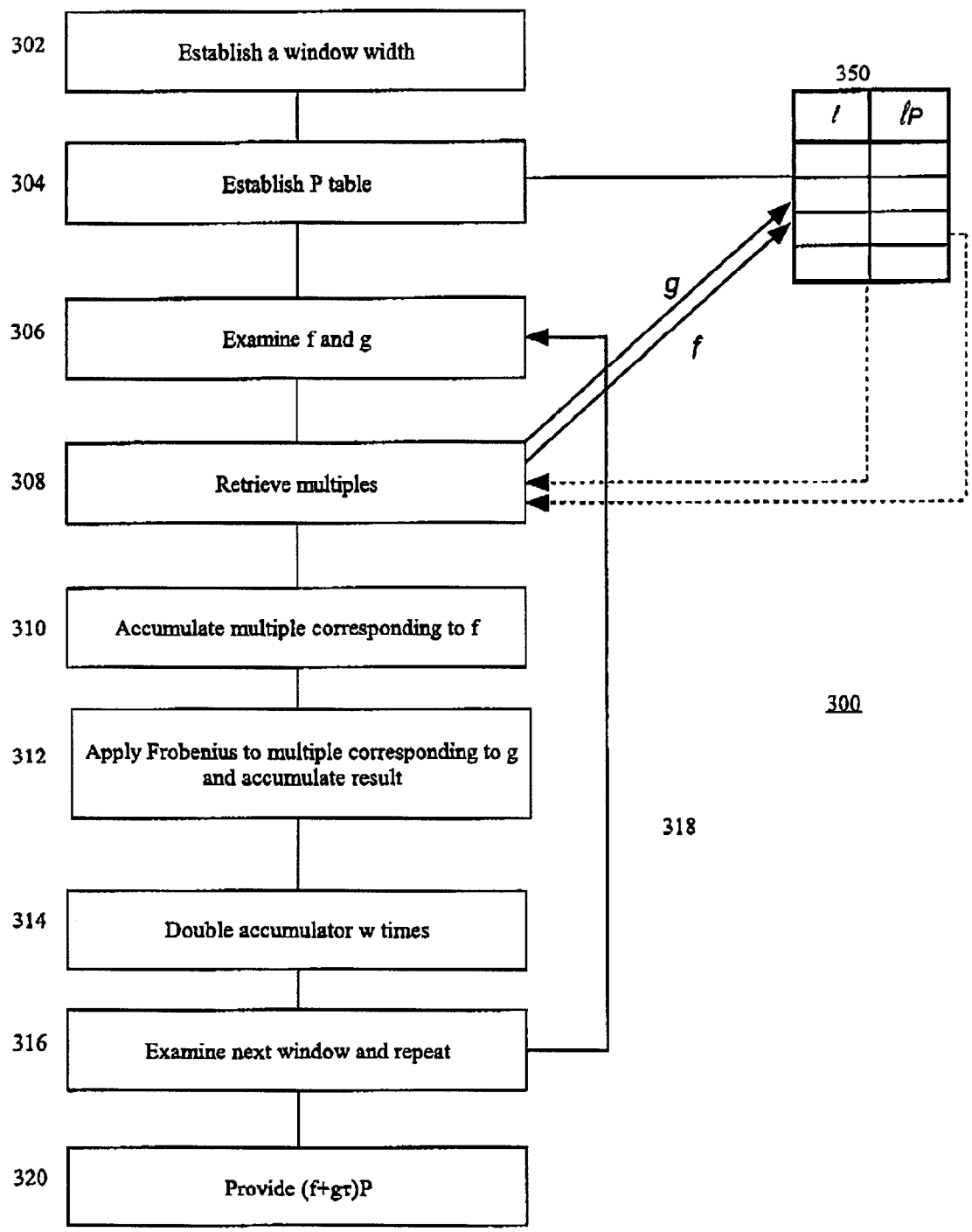
FIG. 3 is a flowchart showing a method used in one step of the method in FIG. 2.

Computing τP can be done efficiently by applying the Frobenius operator to P. The Frobenius operator can be implemented as a shift when using an appropriate basis. As shown in FIG. 3 generally by the numeral 300, to compute the multiple (f+gτ)P, a window width w is first established (302). Then, a table 350 of small multiples of P of the predetermined width w is established (304). The scalars f and g are then examined (306) using windows of the predetermined width w. The multiples of P corresponding to each window are retrieved (308) from the table 350. The table entry from the window corresponding to f is placed 310 in an accumulator. The Frobenius operator is applied to the table entry from the window corresponding to g, and then added to the accumulator 312. The accumulator is doubled in accordance with the width of the window 314, and then the next window is examined 316. The process is repeated 318 until f and g have been processed. At the conclusion of these repetitions, the multiple (f+gτ)P corresponding to kp is provided 320.

It is recognized that it is not necessary to find the best quotient q, but merely a choice for quotient q that yields an exponent equivalent to k modulo T that admits more efficient computation of the scalar multiplication.

Figure 4:
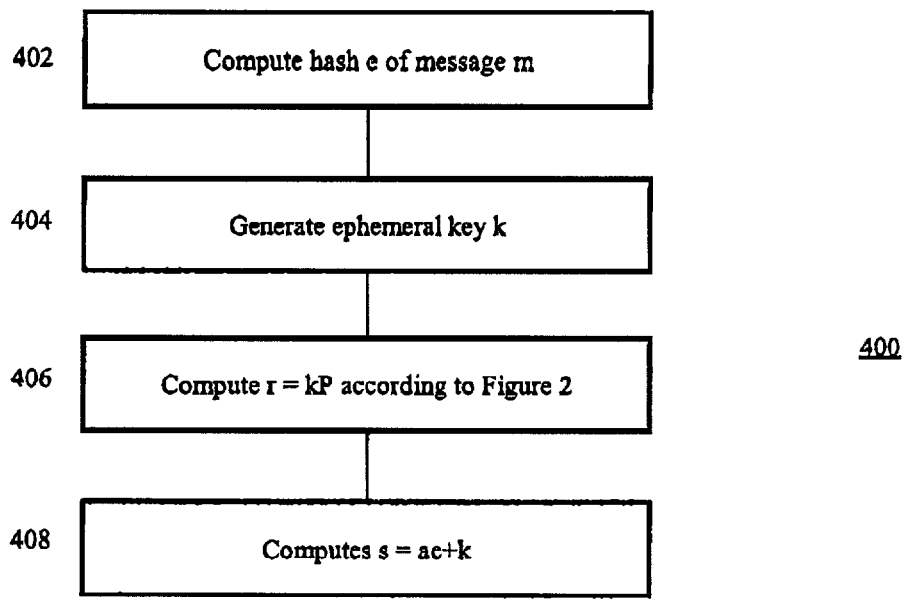
FIG. 4 is a flowchart showing a method of computing a digital signature using the method of FIG. 2.

The rounding function $]x[$ can be the standard decimal rounding function, or a floor function, or a ceiling function. Any function yielding an integer close to the real number will work. The accuracy of the rounding partially determines the accuracy of the approximation to the inverse of the truncator. The significance parameter u also determines the accuracy of the approximation to the inverse of the truncator. It is recognized that there is a trade-off between determining the inverse of the truncator accurately, and achieving efficient computation. By reducing the accuracy of the rounding function and the significance parameter, the steps of the method are made more efficient. The cost of this efficiency in the preliminary stages of the method is to the efficiency of the scalar multiplication In another embodiment the processor implements a signature generation method shown generally as numeral 400 in FIG. 4. In the exemplary signature method, the signature generation requires the computation of a pair of signature components R=kP and s=ae+k, where P is an elliptic curve generating point, k is a short term private key, a is a long term private key, and e is a hash of a message. To perform the signature generation, the signer computes 402 the hash e of a message m. The signer generates 404 an ephemeral private key k. The signer computes 406 a first signature component R=kP, which requires computing a point multiple. Finally, the signer computes 408 a second signature component s=ae+k. The method according to FIG. 2 is used to compute the point multiple.

Figure 5:
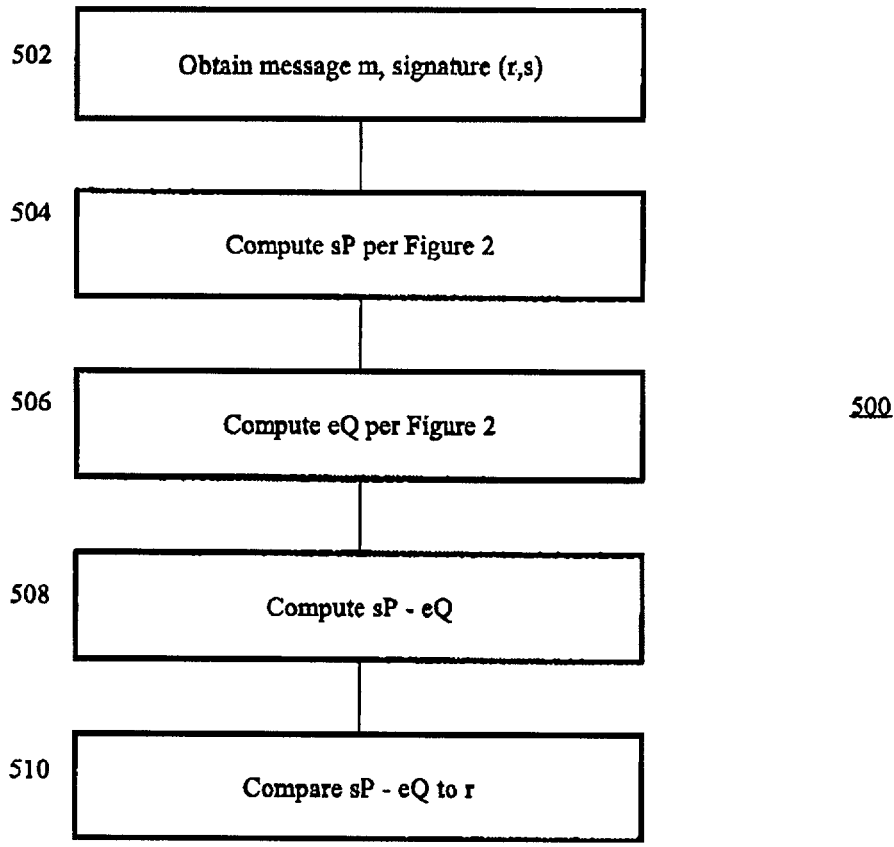
FIG. 5 is a flowchart of a method of verifying a digital signature using the method of FIG. 2.

In still another embodiment, the processor implements a signature verification method shown as numeral 500 in FIG. 5. In the exemplary signature method, the verification requires the computation of the quantity sP−eQ, where P and Q are elliptic curve points, s is a signature component, and e is a hash of a message. One or both of the elliptic curve multiplications sP and eQ is performed using the method shown in FIG. 2. The verifier first obtains 502 a message m and a signature (R, s), which it wishes to verify as originating from a signer. The verifier has an authentic copy of the signer's public key. The verifier computes sP as indicated at 504, using the method of FIG. 2. Then the verifier computes eQ (506) using the method of FIG. 2. Then the verifier computes 508 the quantity sP−eQ and compares at 510 the result to the signature component R. The method according to FIG. 2 is used to compute the point multiple.

Figure 6:
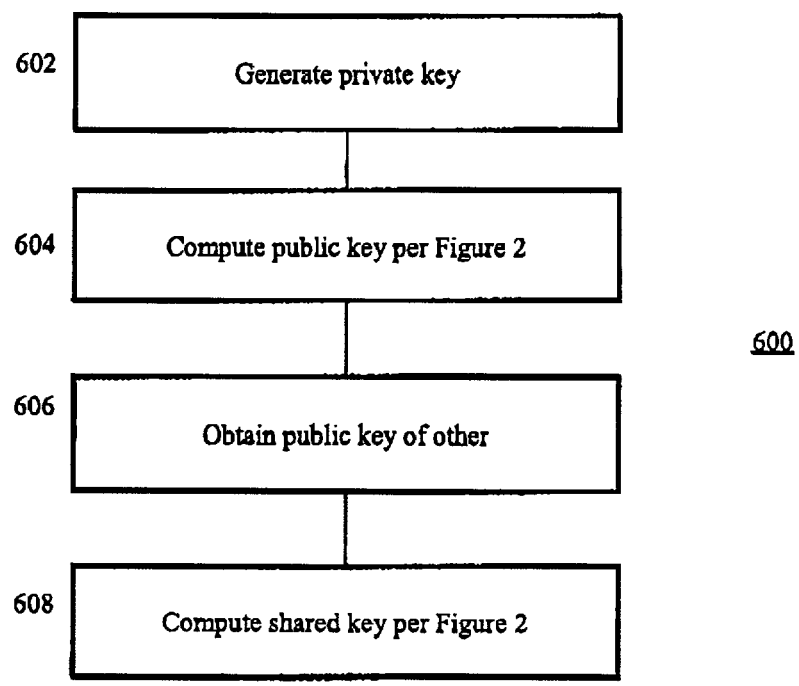
FIG. 6 is a flowchart showing a method of generating a shared secret using the method of FIG. 2.

In a further embodiment, the processor implements a Diffie-Hellman key exchange protocol, shown generally as numeral 600 in FIG. 6. In this protocol, the first correspondent generates 602 a private key k. The first correspondent computes (604) a public key kP using the method of FIG. 2. The first correspondent obtains at 606 a public key kP of the second correspondent. The first correspondent then computes (608) the shared secret key kk'P as the scalar multiplication of the second correspondent's public key and the first correspondent's private key using the method of FIG. 2. The second correspondent can perform a similar computation of the shared secret key from kP and k'.

Each correspondent in such a protocol must generate a private key, then perform a point multiplication to obtain a public key which is sent to the other correspondent. Then, each correspondent performs a point multiplication of his or her own private key with the other correspondent's public key to obtain a shared secret key. Preferably, one or both of the point multiplications performed by the correspondents to compute their public keys is performed using the method according to FIG. 2. More preferably, one or both of the correspondents also uses the method of FIG. 2 to compute the point multiplication required to obtain the shared secret key. Still more preferably, both correspondents use the method of FIG. 2 to compute each of the aforementioned point multiplications.

Figure 7:
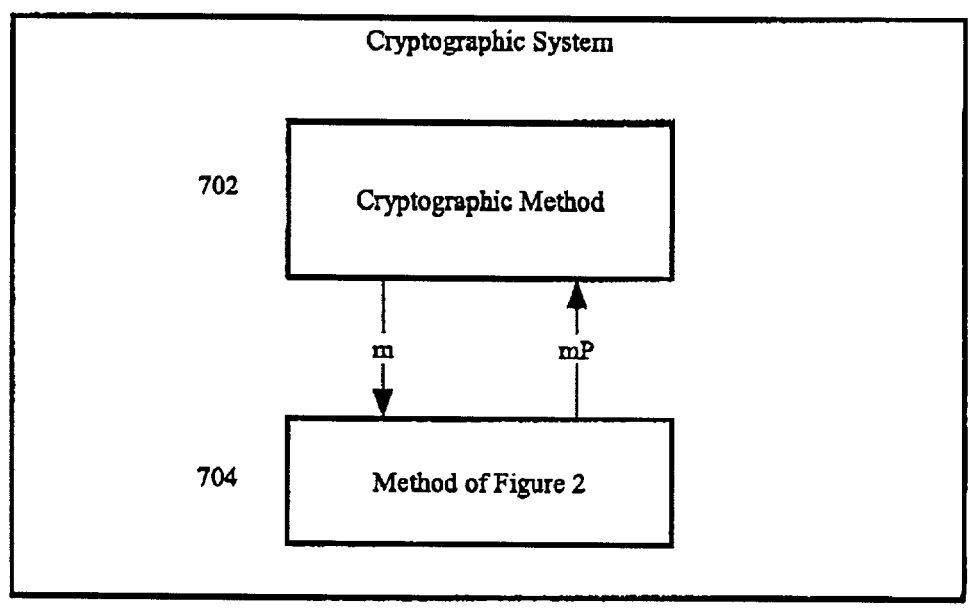
FIG. 7 is a schematic representation of a cryptographic system using the method of FIG. 2.

In a yet further embodiment, the method according to FIG. 2 is used as a component of a cryptographic system to provide a point multiple to any cryptographic method, as shown in FIG. 7. The cryptographic system 700 provides a cryptographic method 702. When the cryptographic method 702 requires a point multiplication mP, it provides m and P to a component 704 implementing the method of FIG. 2. The component 704 computes mP and provides the result to the cryptographic method. The component 704 can be software instructions executable by the cryptographic system 700, or a dedicated hardware component such as an arithmetic logic unit.

Figure 8:
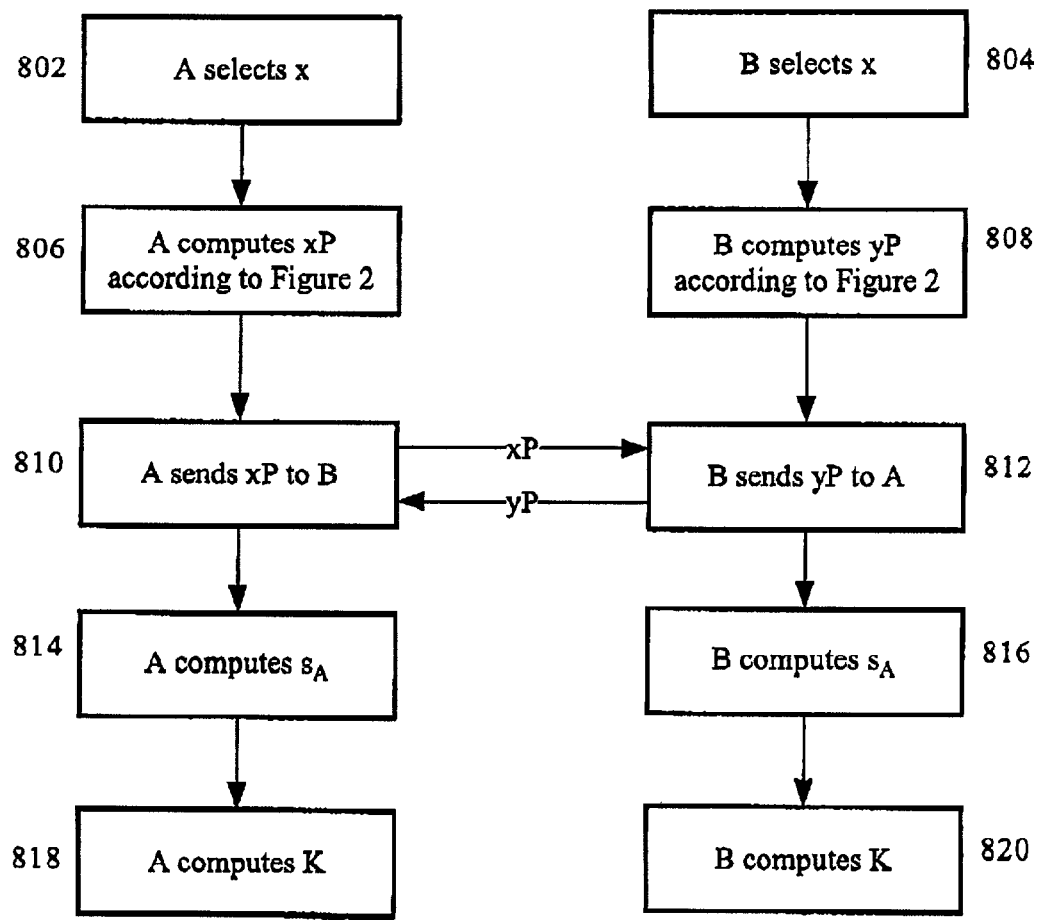
FIG. 8 is a flowchart of a further protocol.

In a still further embodiment, the method according to FIG. 2 is used in the Elliptic Curve MQV (Menezes, Qu, Vanstone) protocol, as shown is FIG. 8. In this protocol, two correspondents Alice and Bob wish to share a secret key. It is assumed that the two correspondents have agreed on an elliptic curve and a generating point P of order q. Each correspondent has a respective long term private key a, b and a corresponding long term public key $Y_A$=aP, $Y_B$=bP. Each correspondent has an authentic copy of the other correspondent's long term public key, which may be obtained from a certificate or a directory or other known methods.

To perform the protocol, Alice selects an ephemeral private key x at random from the interval 1 to q-1 (802). Bob selects an ephemeral private key y at random from the interval 1 to q-1 (804). Alice computes the ephemeral public key xP corresponding to the ephemeral private key x (806) by using the method of FIG. 2. Similarly, Bob computes his ephemeral public key yP (808). Alice sends xP to Bob (810) and Bob sends yP to Alice (812). After Alice receives Bob's ephemeral public key, she computes $s_A$=(x+a$\pi$($R_A$))mod q (814). Then Alice computes the shared secret K=$s_A$($R_B$+T(R)$Y_B$) (818). After Bob receives Alice's ephemeral public key xP, he computes $s_B$=(y+b$\pi$($R_B$))mod q (816). Ten Bob computes K=$s_B$($R_A$+$\pi$($R_A$)$Y_A$) (820). When computing $R_A$ and $R_B$, it is recognized that either or both of the correspondents may use the method of FIG. 2.

Although the invention has been described with reference to certain specific embodiments, various modifications thereof will be apparent to those skilled in the art without departing from the spirit and scope of the invention as outlined in the claims appended hereto.

It is recognized that the method of FIG. 2 may be applied widely and in many different protocols and applications. One further example is that the method of FIG. 2 may be applied to any of the simultaneous multiplication methods, as exemplified in FIG. 3.

The embodiments of the invention in which an exclusive property or privilege is claimed are defined as follows:

1. A method of providing a point multiple in an elliptic curve cryptosystem for performing cryptographic operations, said point multiple being derived from a scalar and a point on an elliptic curve having an equation of the form $y^2+xy=x^3+a_1x^2+1$, where $a_1$ is either 0 or 1, said method comprising the steps of
    a) obtaining a pair of coefficients derived from a truncator of said elliptic curve;
    b) computing a representation of said scalar from said pair of coefficients, said scalar, and said truncator of said elliptic curve;
    c) computing said point multiple using said representation of said scalar and a Frobenius mapping $\tau$; and
    d) providing said point multiple to said elliptic curve cryptosystem for use in said cryptographic operations; wherein said truncator is $$\frac{\tau^m - 1}{\tau - 1},$$

and wherein m is the extension degree of a finite field over which said elliptic curve is defined.

2. A method according to claim 1, wherein said pair of coefficients corresponds to an approximation of the inverse of said truncator.

3. A method according to claim 2, wherein said approximation is determined by a significance parameter.

4. A method according to claim 1, wherein said representation of said scalar is equivalent to said scalar modulo said truncator.

5. A method according to claim 2, further comprising the step of computing a quotient derived from said pair of coefficients and said scalar and using said quotient to perform the step of computing said representation of said scalar.

6. A method according to claim 5, wherein said quotient is equivalent to a product of said scalar and said approximation of said inverse of said truncator.

7. A method according to claim 6, wherein said representation of said scalar is equivalent to a remainder after division of said scalar by said truncator.

8. A method of computing a key for use in a cryptographic system, said key being derived from a scalar and a point on an elliptic curve having an equation of the form $y^2 - xy = x^9 a_1 x^2 1$, where $a_1$, is either 0 or 1, said method comprising the steps of:
   a) obtaining a pair of coefficients derived from a truncator of said elliptic curve;
   b) computing a representation of said scalar from said pair of coefficients, said scalar, and said truncator of said elliptic curve;
   c) computing a point multiple using said representation of said scalar and a Frobenius mapping $\tau$; and
   d) using said point multiple for computing said key for use in said cryptographic system;
   wherein said truncator is $$\frac{\tau^m - 1}{\tau - 1},$$

and wherein m is the extension degree of a finite field over which said elliptic curve is defined.

9. In a method of computing an elliptic curve digital signature requiring a point multiple for use in a cryptographic system, the improvement comprising computing said point multiple by the steps of:
   a) obtaining a pair of coefficients derived from a truncator of said elliptic curve;
   b) computing a representation of said scalar from said pair of coefficients, said scalar, and said truncator of said elliptic curve;
   c) computing said point multiple using said representation of said scalar and an endomorphism of said elliptic curve; and
   d) using said point multiple for computing said elliptic curve digital signature for use in said cryptographic system;
   wherein said truncator is $$\frac{\tau^m - 1}{\tau - 1},$$

and wherein m is the extension degree of a finite field over which said elliptic curve is defined.

\* \* \* \* \*

UNITED STATES PATENT AND TRADEMARK OFFICE
CERTIFICATE OF CORRECTION

| | | |
|---|---|---|
| PATENT NO. | : 7,215,780 B2 | |
| APPLICATION NO. | : 10/058214 | |
| DATED | : May 8, 2007 | |
| INVENTOR(S) | : Robert J. Lambert, Ashok Vadekar and Adrian Antipa | |

It is certified that error appears in the above-identified patent and that said Letters Patent is hereby corrected as shown below:

In the Drawings:
Text in Figure 8 has changed from "B selects x" to -- B selects y --

Text in Figure 8 has changed from "B computes $s_A$" to -- B computes $s_B$ --

In column 7, line 67 delete "is" and replace with "in"

Signed and Sealed this
Fourteenth Day of June, 2011

David J. Kappos
*Director of the United States Patent and Trademark Office*